Dec. 16, 1969  T. V. LICCARDI ET AL  3,483,949

METALLIC SOL LUBRICANT FOR A BEARING OR PLUG VALVE

Filed July 12, 1967

INVENTORS
THOMAS V. LICCARDI
STEPHEN N. STEEN
EDWARD J. GELB
BY
Ward, Haselton, McElhannon, Brooks & Fitzpatrick
ATTORNEYS.

United States Patent Office 3,483,949
Patented Dec. 16, 1969

3,483,949
METALLIC SOL LUBRICANT FOR A BEARING
OR PLUG VALVE
Thomas V. Liccardi, 93 Beaumont Circle, Yonkers, N.Y.
10710; Stephen N. Steen, New York, N.Y. (600 W.
246th St., Bronx, N.Y. 10471); and Edward J. Gelb,
26 Beverly Way, Wayne, N.J. 07470
Filed July 12, 1967, Ser. No. 652,788
Int. Cl. F16n 1/00; F16c 1/24
U.S. Cl. 184—1
16 Claims

ABSTRACT OF THE DISCLOSURE

A plug valve or bearing or the like is lubricated and sealed with a metallic sol. The dispersion medium is an alloy such as solder or a brazing composition which is solid at room temperature but molten at the temperature of use. Molybdenum disulfide and graphite are dispersed throughout the alloy with the assistance of a protective colloid such as sodium silicate, lead oxide, potassium silicate or zinc oxide.

---

The present invention relates to a lubricated assembly capable of operation at high temperatures where ordinary organic lubricants decompose or deteriorate.

There are many instances where it is necessary to lubricate the surfaces of moving metal parts to prevent wear and permit freedom of movement, but difficulty is encountered because of the elevated temperatures involved. A simple bearing for a shaft operating in a high temperature environment is an example. Another example is a valve for controlling hot gases or fluids, particularly the rotating plug type.

Greases or organic lubricants decompose at comparatively low temperatures. In the case of bearings, solid lubricants are known, but these have certain drawbacks or limitations. With a valve, a solid lubricant does not solve the temperature problem because it is still necessary to establish seals around the fluid passages and, in general, known seals are subject to deterioration at elevated temperatures.

The present invention provides a new lubricant and a novel lubricated assembly as well as a novel method of lubrication. Essentially, there is provided a lubricant which is primarily metallic and a solid at room temperature, but becomes liquid or viscous at normal operating temperatures. The lubricant is technically a colloidal solution or sol with the dispersion medium being a metal alloy. One significant aspect of the invention is the discovery of the technique for controlling or tailoring the viscosity of the sol to the requirements of the particular end use. It should be understood that when reference is made to the viscosity of the sol it is the viscosity of the composition at the normal operating temperature, such temperature being above the melting point of the base alloy.

In accordance with one aspect of the invention there is provided an assembly of at least two interfitted metallic members with a lubricant therebetween arranged for relative movement when at an elevated temperature, the lubricant being a sol having a metallic dispersion medium and a dispersed phase, the dispersion medium being a solid bonded to the members at room temperature, a liquid at the elevated temperature, and able to wet the surfaces of the two members with which it is in contact when in its liquid state, the dispersed phase being a lubricative material which is solid at the elevated temperature and of colloidal particle size.

Figure 1:
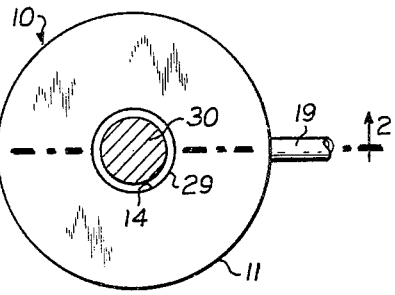
Figure 2:
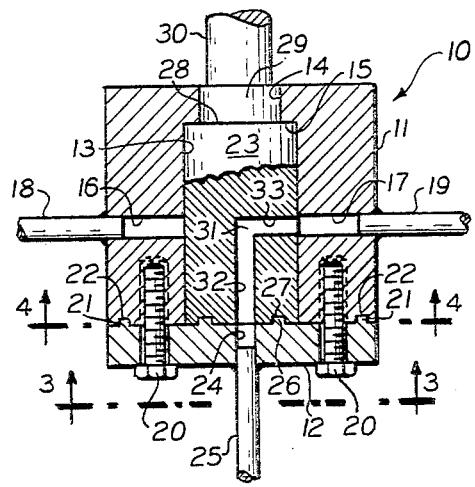
Figure 3:
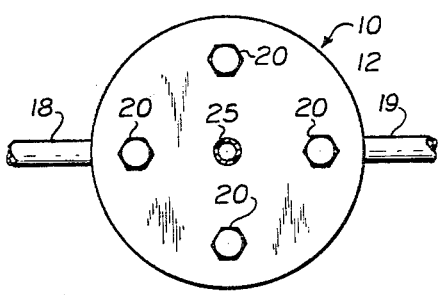
Figure 4:
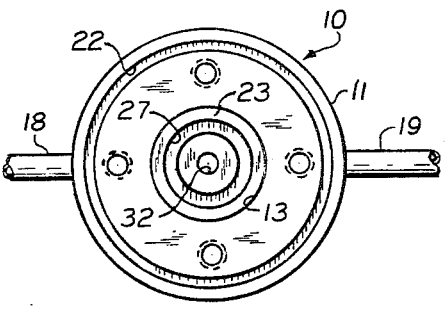
Figure 5:
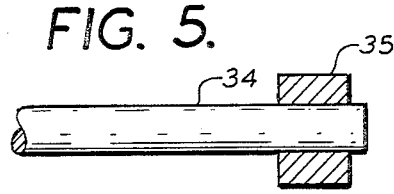

The invention will be better understood after reading the following detailed description of the presently preferred embodiments thereof with reference to the appended drawings, in which:

FIGURE 1 is a plan view of a rotating plug type two-way valve embodying the present invention;
FIGURE 2 is a vertical sectional view taken along line 2—2 of FIGURE 1;
FIGURES 3 and 4 are sectional views taken along lines 3—3 and 4—4, respectively, of FIGURE 2; and
FIGURE 5 is a diagrammatic representation, partly in section, showing another embodiment of the invention.

Referring now to the drawings, and particularly to FIGURES 1 to 4, there is shown a rotary plug type of fluid valve. The housing 10 may be made of stainless steel and formed in two parts, a main body section 11, and a cap 12.

The main body section 11 is provided with a through central cylindrical bore 13 having a reduced diameter section 14 at one end, creating a shoulder 15, as shown. A plurality of radial ports or passages, in this instance the two passages 16 and 17, are located in a common plane normal to the axis of bore 13. Passages 16 and 17 communicate with bore 13 and also with the exterior of section 11. Metal tubing 18 and 19 may be joined to the respective passages 16 and 17 by brazing or other means.

Cap 12, also of stainless steel, is joined by bolts 20 to one end of the housing section 11. As shown, the cap is provided with an annular rib 21 which interfits or mates with a complemental groove 22 in section 11. The arrangement of rib 21 and groove 22 functions to locate cap 12 relative to the axis of the bore 13. This insures proper alignment between the rotary valve member 23 to be described, and the central passage 24 which passes through cap 12 and communicates with the tube 25 joined thereto by brazing or the like.

The cap 12 is also provided with an annular rib 26 which is concentric with the axis of passage 24. Rib 26 mates with a complemental groove 27 in the end face of rotary plug member 23. As shown, the plug member fills the bore 13 in housing section 11 and is complementally stepped in diameter both to have a shoulder 28 which engages shoulder 15 and a reduced section 29 making a bearing fit with the related section 14 of the bore in the housing.

A stem 30 projects from plug 23 and from the housing 10 for enabling the plug to be rotated. An angled passage 31 is provided in plug 23 with one leg 32 lying on the plug axis and the other leg 33 extending radially. As shown, leg 32 is aligned with passage 24 in cap 12 and maintains such alignment throughout rotation of the plug. The locating function afforded by rib 26 and groove 27 insures uniform clearance around the circumference of plug 23 for a reason to be described. The preferred clearance between all surfaces of the plug member 23 and the adjacent surfaces of the housing 10 is approximately 0.001 inch.

It should be apparent from the foregoing description that with the valve in the position shown in the drawings the tube or conduit 19 is connected to the tube 25. Rotating the plug 23 through 180° alters the connection so as to couple tube 18 to tube 25.

A plug valve of the general type described above requires some means for providing a fluid seal between the movable member or plug and the housing around the flow passages therethrough. When the valve is to be used at elevated temperatures, the sealing means must be resistant to such temperature. In accordance with the present invention the necessary seals are provided by filling the space between the plug 23 and the housing 10, that is the space represented by the 0.001 inch clearance, with the metallic sol.

As a typical example, a quantity of solder of composition 60% lead–40% tin is heated to the molten state in a crucible. A quantity of molybdenum disulfide and graphite, both of colloidal particle size less than 5 microns, is added to the molten solder along with a quantity of sodium silicate, sufficient to thicken the molten composition until its viscosity is on the order of that of a petroleum jelly. The quantity of sodium silicate should be sufficient to cause all of the molybdenum disulfide and graphite to become dispersed throughout the solder. It will be understood that the sodium silicate functions as a protective colloid to maintain the dispersed phase, the molybdenum disulfide and graphite, in suspension or dispersed throughout the dispersion medium, the resultant sol represents a lyophile system.

The next step is to coat the mating surfaces of the plug 23 and housing sections 11 and 12 by dipping or the like. A convenient procedure is to heat all of the parts above the melting point of the sol and dip the plug. Then while the sol is still liquid assemble the valve. Suitable steps are taken to keep the passage 31 free of the sol or to remove any that enters. Once the valve is assembled, the capillary effect due to the small clearance, and the viscosity and cohesiveness of the sol will prevent the sol from entering the various passages therein.

The valve is then aligned in one of its two operative positions and permitted to cool. Naturally, the sol will solidify at room temperature and bind the valve in the particular position by bonding to the valve members. It is assumed that when the valve is to be used it will first be heated by the hot fluid passing through it or by auxiliary means (not shown) until the sol melts, whereupon it can be manipulated. It has been found that the viscosity of the sol can be raised to the point where it maintains a fluid seal in the presence of elevated pressure and at high temperature without being forced into the flow passages or out of the housing.

Another method of coating the parts which has been found satisfactory is to first coat either the bore 13 and that surface of the cap 12 which closes the end of bore 13, or the plug 23, with pure solder, e.g., a 60–40 composition. Then the mating surfaces of the part that has not been coated with solder is coated, e.g., by spraying, with a mixture of sodium silicate, molybdenum disulfide, and graphite. The parts of the valve are assembled and then heated until the solder melts. By manipulating the valve the coatings blend and form the sol in situ, whereupon the same assembly results as before.

In the examples described above the base alloy or dispersion medium was described as a conventional 60–40 solder. However, various other lead-tin compositions as well as other alloys will work equally well and can be utilized in the same manner. In certain cases they may be preferred because of their different melting points. Alloys of copper and antimony of varying composition have been employed. Also used with success were alloys of copper and tin as well as lead and bismuth, and lead and antimony. It is believed that most any solder or brazing composition can be used.

It is contemplated that inorganic lubricative materials in addition to molybdenum disulfide and graphite may be employed so long as the material is of colloidal particle size, will not react with any of the other ingredients of the sol, and will disperse within the base alloy to form a colloidal suspension or solution.

An important discovery underlying the present invention is that with the aid of a protective colloid such as sodium silicate it is possible to increase the loading of the base alloy with the lubricative solids until gelation occurs. It has been estimated that a viscosity on the order of 1,000 poise can be obtained. Again, it should be understood that the viscosity of the sol is being considered at a temperature above its melting point. It will also be appreciated that the gelation referred to is elastic in nature and can be reversed by the addition of base alloy material.

Although the material mentioned for construction of the valve parts is stainless steel, other metals can be used so long as the alloy sol wets or bonds thereto.

While the alloy sol lubricant described above is ideally suited for lubricating and sealing a plug valve, it can also be employed efficaciously as a bearing lubricant. In FIGURE 5 there is shown diagrammatically a rod or shaft 34 supported by a bearing 35, the latter being mounted in any known manner by means not shown. The shaft 34 should fit within bearing 35 with a slight clearance on the order of 0.001 inch, which space is occupied by a layer of the sol. It is assumed that the bearing assembly will be used in an environment exceeding the melting point of the sol or that auxiliary heating means (not shown) will be employed to maintain the temperature above the melting point. Of course, the principal advantage is that the sol does not decompose or deteriorate at temperatures that would destroy organic lubricants.

Having described the invention with reference to certain presently preferred embodiments thereof, it will be understood by those skilled in the art that numerous changes may be made therein without departing from the true spirit of the invention.

What is claimed is:

1. An assembly of at least two interfitted metallic members with a lubricant therebetween arranged for relative movement when at an elevated temperature, said lubricant being a sol having a metallic dispersion medium, a protective colloid, and a dispersed phase, said dispersion medium being a solid bonded to said members at room temperature, a liquid at said elevated temperature, and able to wet the surfaces of said two members with which it is in contact when in its liquid state, said dispersed phase being a lubricative material which is solid at said elevated temperature and of colloidal particle size.

2. An assembly according to claim 1, wherein said dispersion medium is a metal alloy.

3. An assembly according to claim 2, wherein said alloy is selected from the group consisting of solders and brazing compositions.

4. An assembly according to claim 3, wherein said alloy is selected from the group consisting of alloys of lead-tin, copper-tin, lead-antimony, copper-antimony, and lead-bismuth.

5. An assembly according to claim 1, wherein said lubricative material consists of one or more materials selected from the group consisting of molybdenum disulfide and graphite.

6. An assembly according to claim 5, wherein the protective colloid is selected from the group consisting of sodium silicate, lead oxide, potassium silicate, and zinc oxide.

7. An assembly according to claim 1, wherein the protective colloid is selected from the group consisting of sodium silicate, lead oxide, potassium silicate, and zinc oxide.

8. An assembly according to claim 1, wherein said two members constitute the housing and movable member of a fluid control valve, and said sol provides a fluid seal between the movable member and the housing around the flow passages therethrough.

9. An assembly according to claim 8, wherein said dispersion medium is a metal alloy coating the contacting surfaces of said housing and movable member, said alloy being selected from the group consisting of solders and brazing compositions.

10. An assembly according to claim 9, wherein said lubricative material consists of one or more materials selected from the group consisting of molybdenum disulfide and graphite.

11. An assembly according to claim 10, wherein the sol includes a protective colloid selected from the group consisting of sodium silicate, lead oxide, potassium silicate, and zinc oxide.

12. An assembly according to claim 1, wherein said two members constitute a bearing, and a member supported by said bearing for movement relative thereto with said sol providing lubrication therebetween.

13. Method of lubricating two interfitted metallic members for relative movement when at an elevated temperature which comprises applying to the surfaces to be lubricated a thin layer of a sol having a metallic dispersion medium, a protective colloid, and a dispersed phase, said dispersion medium being characterized by the fact that it is a solid bonded to said surfaces at room temperature but becomes liquid at said elevated temperature and wets said surfaces, said dispersed phase being a lubricative material which is solid at said elevated temperature and of colloidal particle size.

14. Method according to claim 13, wherein said sol is applied to the surfaces to be lubricated by coating one of the surfaces with said metallic dispersion medium, coating the surface which mates with said one surface with a mixture of said dispersed phase and said protective colloid, bringing the members together and applying heat and pressure to melt the dispersion medium and create the sol in situ.

15. Method according to claim 13, wherein said sol is applied to the surfaces to be lubricated by preparing a molten sol of said dispersion medium and said dispersed phase along with said protective colloid, coating at least one of each pair of mating surfaces to be lubricated with said molten sol, and permitting said sol to solidify.

16. A lubricant for lubricating the contacting surfaces of two interfitted metallic members at an elevated temperature which comprises a metallic dispersion medium, a protective colloid, and a dispersed phase combined to form a sol; said dispersion medium being a solid alloy at room temperature capable of bonding to said metallic member, and a liquid at said elevated temperature; and said dispersed phase being a lubricative material which is solid at said elevated temperature and of colloidal particle size.

References Cited

UNITED STATES PATENTS

| | | | |
|---|---|---|---|
| 2,901,380 | 8/1959 | Crump | 308—240 XR |
| 2,980,475 | 4/1961 | Wolfe | 308—240 |
| 3,115,395 | 12/1963 | Putt et al. | 29—195 XR |
| 3,194,759 | 7/1965 | Devine et al. | 184—1 XR |
| 3,206,264 | 9/1965 | Dalzell et al. | 308—240 |
| 3,234,758 | 2/1966 | Lewis | 184—1 XR |

FRED C. MATTERN, JR., Primary Examiner

MANUEL ANTONAKAS, Assistant Examiner

U.S. Cl. X.R.

308—240

PO-1050
(5/69)

UNITED STATES PATENT OFFICE
CERTIFICATE OF CORRECTION

Patent No. 3,483,949        Dated December 16th, 1969

Inventor(s) Thomas V. Liccardi, Stephen N. Steen and Edward J. (

It is certified that error appears in the above-identified patent and that said Letters Patent are hereby corrected as shown below:

Column 3, between lines 59 and 60, insert the following paragraph:

Other protective colloids have been tried successfully. These are lead oxide, potassium silicate, and zinc oxide.

SIGNED AND
SEALED
MAY 12 1970

(SEAL)
Attest:

Edward M. Fletcher, Jr.
Attesting Officer

WILLIAM E. SCHUYLER,
Commissioner of Pate